United States Patent
Pollock et al.

(10) Patent No.: US 6,691,242 B1
(45) Date of Patent: Feb. 10, 2004

(54) SYSTEM TEST AND METHOD FOR CHECKING PROCESSOR OVER-CLOCKING BY RETRIEVING AN ASSIGNED SPEED FROM AN REGISTER INTERNAL TO THE PROCESSOR, COMPARING WITH RUNNING SPEED, AND DISPLAYING CAUTION MESSAGE TO USER

(75) Inventors: Steven L. Pollock, Hillsboro, OR (US); Ted T. Honma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 09/585,860

(22) Filed: Jun. 1, 2000

(51) Int. Cl.⁷ .................................................. G06F 11/27
(52) U.S. Cl. ........................ 713/503; 713/500; 713/501; 713/502
(58) Field of Search ................................ 713/500–503; 709/222; 711/103, 115; 714/36, 42, 46; 710/10, 104

(56) References Cited

U.S. PATENT DOCUMENTS

| | | | | |
|---|---|---|---|---|
| 5,774,703 A | * | 6/1998 | Weiss et al. | 713/501 |
| 5,784,599 A | * | 7/1998 | Elkhoury | 713/501 |
| 5,845,111 A | * | 12/1998 | Lin et al. | 713/501 |
| 5,935,255 A | * | 8/1999 | So et al. | 713/400 |
| 6,035,407 A | * | 3/2000 | Gebara et al. | 713/300 |
| 6,148,397 A | * | 11/2000 | Chang | 713/1 |
| 6,161,175 A | * | 12/2000 | Kim et al. | 713/1 |
| 6,385,735 B1 | * | 5/2002 | Wilson et al. | 713/501 |
| 6,457,137 B1 | * | 9/2002 | Mitchell et al. | 713/400 |
| 2002/0059537 A1 | * | 5/2002 | Wilson et al. | 713/500 |

OTHER PUBLICATIONS

The Chick Magnet, Subject: Celery 366 & BX6r2, dtd:Mar. 27, 1999, Newsgroups: alt.comp.hardware.overclocking.*
Ross, Subject: OT: ABIT BX6 & Overclocking a 266, dtd:Mar. 4, 1999, Newsgroups: 3dfx.products.voodoo2.*
Maniaque, Subject: Help needed with BH6 and Celeron 400, dtd:Jun. 8, 1999, Newsgroups: alt.comp.periphs.mainboard.abit.*
Chris, Subject: Re: Are some 233MMX's really not overclocked at all ?, dtd:Oct. 3, 1997, Newsgroups: comp.sys.ibm.pc.hardware.chips.*
IBM TDB vol. 25, issue 11A, page No. 5847–5848, Title: "Operating System CPUSPEED Determination in Multiprocessors" DAT. Apr., 1983.*
RD 430032 A Feb. 2000.*
www.tomshardware.com/guides/overclocking/index.html.

* cited by examiner

*Primary Examiner*—Thomas Lee
*Assistant Examiner*—Nitin C. Patel
(74) *Attorney, Agent, or Firm*—Marger Johnson & McCollom, PC

(57) ABSTRACT

The present invention is designed to test whether a Central Processing Unit (CPU) in a computer system is being overclocked. That is, being run at a speed higher than its rated or assigned speed. An important feature of the present invention is that it is internal to the computer system on which it operates. That is, the test of the present invention is implemented in the computer system's Basic Input/Output System or as microcode stored directly on the CPU. The end user need not resort to any external means such as a floppy or CD disk to test the CPU included in his/her computer system. If the CPU is not overclocked, the test runs invisible to the end user. If, on the other hand, the CPU is overclocked, the test allows the user to either continue with the normal boot up process or exit the boot up process to adjust the running speed to substantially match the assigned speed of the CPU.

18 Claims, 2 Drawing Sheets

SYSTEM TEST AND METHOD FOR CHECKING PROCESSOR OVER-CLOCKING BY RETRIEVING AN ASSIGNED SPEED FROM AN REGISTER INTERNAL TO THE PROCESSOR, COMPARING WITH RUNNING SPEED, AND DISPLAYING CAUTION MESSAGE TO USER

BACKGROUND OF THE INVENTION

1. Field of the Invention

This invention relates to computer system tests and, more particularly, to a Basic Input/Output System (BIOS) test for determining when a Central Processing Unit (CPU) is being overclocked.

2. Description of the Prior Art

The term overclocking is used to describe the process of running the CPU or processor in a Personal Computer (PC) at a clock and/or bus speed higher than that for which it was designed or specified. The terms CPU and processor are used interchangeably in the foregoing description. The motivation behind overclocking a CPU is to increase system performance at very little cost, that is, without having to purchase a more expensive, faster CPU. Many times, overclocking is accomplished by merely changing a few settings on the PC's motherboard. Other times, overclocking requires that additional components be added to the PC—primarily for cooling purposes—to achieve the sought after performance improvement.

Overclocking a CPU has several negative consequences for both end-users and CPU manufacturers. Overclocking generally degrades the reliability of a CPU because an overclocked CPU generally operates at higher temperatures than a CPU running at rated speed. The increased temperatures can trigger certain failure mechanisms, e.g., electromigration, which create physical defects in the silicon making up the CPU. These defects, over time, can cause the CPU to fail completely, reducing its useful life. The increased temperatures can also trigger operational failures because design parameters such as set up and hold times are not optimized. Overclocking increases the probability of a system wide failure that can lead to an irrecoverable loss of data. Worse yet, overclocking can result in intermittent CPU failures. Intermittent failures are difficult to track and fix because they are inherently difficult to duplicate.

Reliability degradation such as that described above reflects adversely on the quality of the CPUs produced by the CPU manufacturer. Resellers sometimes overclock CPUs without the knowledge or consent of the end user. End users have no easily discernable way of identifying an overclocked CPU particularly when the CPU contained in the system has been unscrupulously relabeled to identify it as a faster CPU. Moreover, overclocking negatively impacts the revenue of CPU manufacturers because resellers and end users purchase less expensive, slower CPUs for overclocking instead of purchasing more expensive, faster CPUs.

Accordingly, a need remains for a readily available internal system test that will allow end users to identify overclocked CPUs.

BRIEF DESCRIPTION OF THE DRAWINGS

The foregoing and other objects, features, and advantages of the invention will become more readily apparent from the following detailed description of a preferred embodiment that proceeds with reference to the following drawings.

DETAILED DESCRIPTION OF THE PREFERRED EMBODIMENT

The present invention relates to an internal test for determining whether a CPU is being overclocked, that is, run at a higher speed than its assigned speed. An important feature of the present invention is that the test is internal to the computer system on which it operates. The test of the present invention is implemented in either hardware or software included within the computer system. The test of the present invention is preferably implemented as a routine in the system BIOS or as microcode in the CPU itself. By doing so, the end user need not resort to any external means, such as a program loaded on a floppy disk, to test the CPU included in his/her computer system. If the CPU is not overclocked, the test runs invisible to the end user. If, on the other hand, the CPU is overclocked, the test allows the user to either continue with the normal boot up process, at the end user's own risk, or exit the boot up process to adjust the running speed to substantially match the assigned speed of the CPU.

Figure 1:
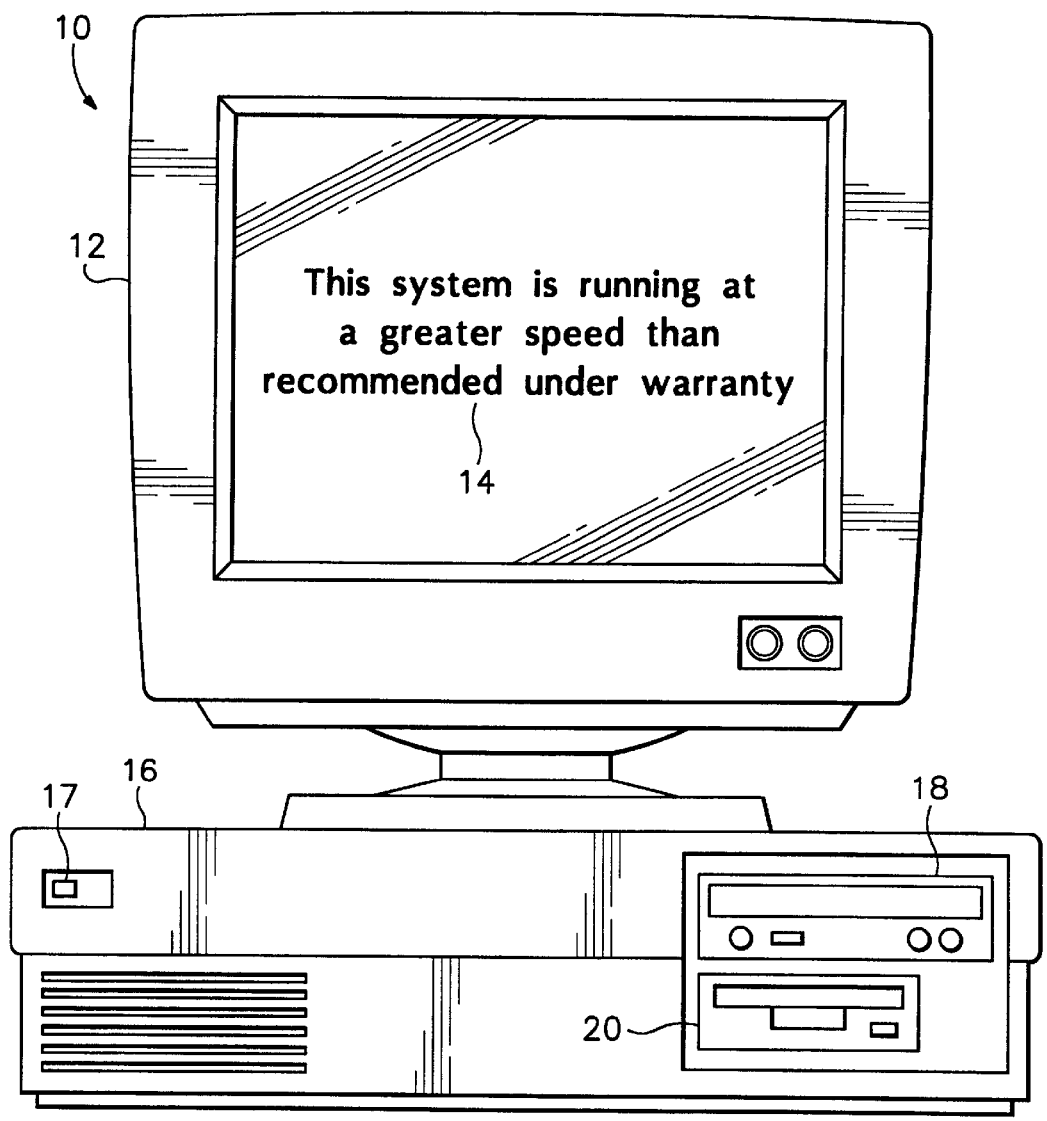
FIG. 1 is an illustration of computer with a caution screen resulting after applying the test of the present invention.
Figure 2:
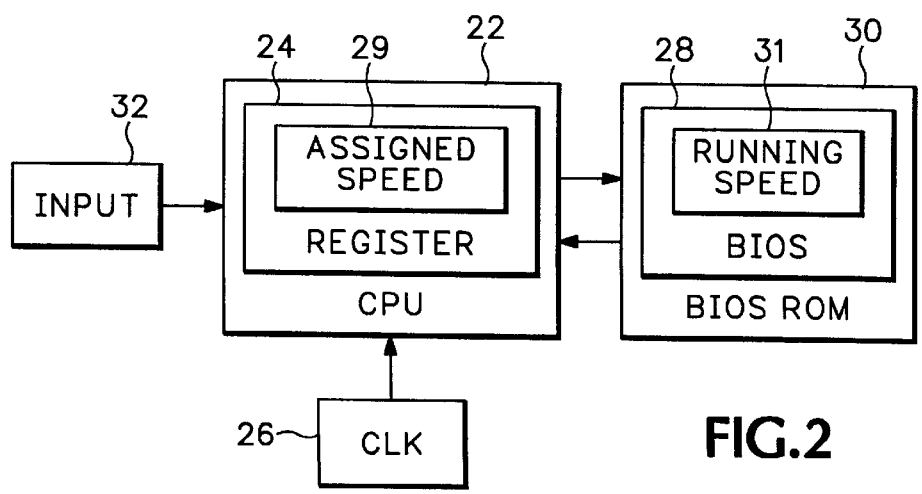
FIG. 2 is a block diagram of a computer system.

Referring to FIGS. 1–2, a computer system 10 comprises a monitor 12 coupled to a computer 16 using well-known cables (not shown). The computer 16 includes a CPU 22, a clock 26, and a BIOS 28. The CPU 22 performs most of the calculations necessary to operate the computer system 10. The CPU 22 is considered the brains of the computer. Two typical components of the CPU 22 are the arithmetic logic unit (ALU) (not shown) and the control unit (not shown). The ALU performs arithmetic and logical operations. The control unit extracts instructions from memory and decodes and executes them, calling the ALU when necessary.

The BIOS 28 is built in software that determines the operation of computer 16 without access to external programs from, e.g., a floppy or CD disk. The BIOS 28 tests and controls hardware devices at start up—e.g., monitor 12, compact disk drive 18, floppy disk drive 20, serial communications (not shown), keyboard (not shown) and the like—, starts the operating system (not shown), and supports the transfer of data among the hardware devices. The BIOS 28 is executed when the computer 16 is turned on. The BIOS 28 is typically stored in a Read Only Memory (ROM) device 30 internal to the computer 16. By doing so, damage to the BIOS 28 produced by hard disk (not shown) failures is prevented. Although critical to performance, the BIOS 28 usually operates invisible to the end user.

Because Random Access Memory (RAM) devices (not shown) are faster than ROM devices, many computer manufacturers design computer systems, such as system 10, so that the BIOS 28 is copied from e.g., ROM 30 to RAM each time the computer is booted. This technique is often termed shadowing. Alternatively, the BIOS 28 is recorded on a flash memory device (not shown). The flash memory device is a special type of ROM that can be erased and reprogrammed allowing for easy updating when necessary.

The test of the present invention comprises instructions stored in a storage medium internal to the computer 16. In one embodiment, the test instructions are implemented in BIOS 28 stored on ROM 30. In another embodiment, the test instructions are implemented as microcode—lowest level instructions—stored or hard wired directly on the CPU 22. Those of skill in the art will appreciate any suitable means of implementing the block diagram of FIG. 2 or the flowchart of FIG. 3 are contemplated as being within the spirit and scope of the invention.

Figure 3:
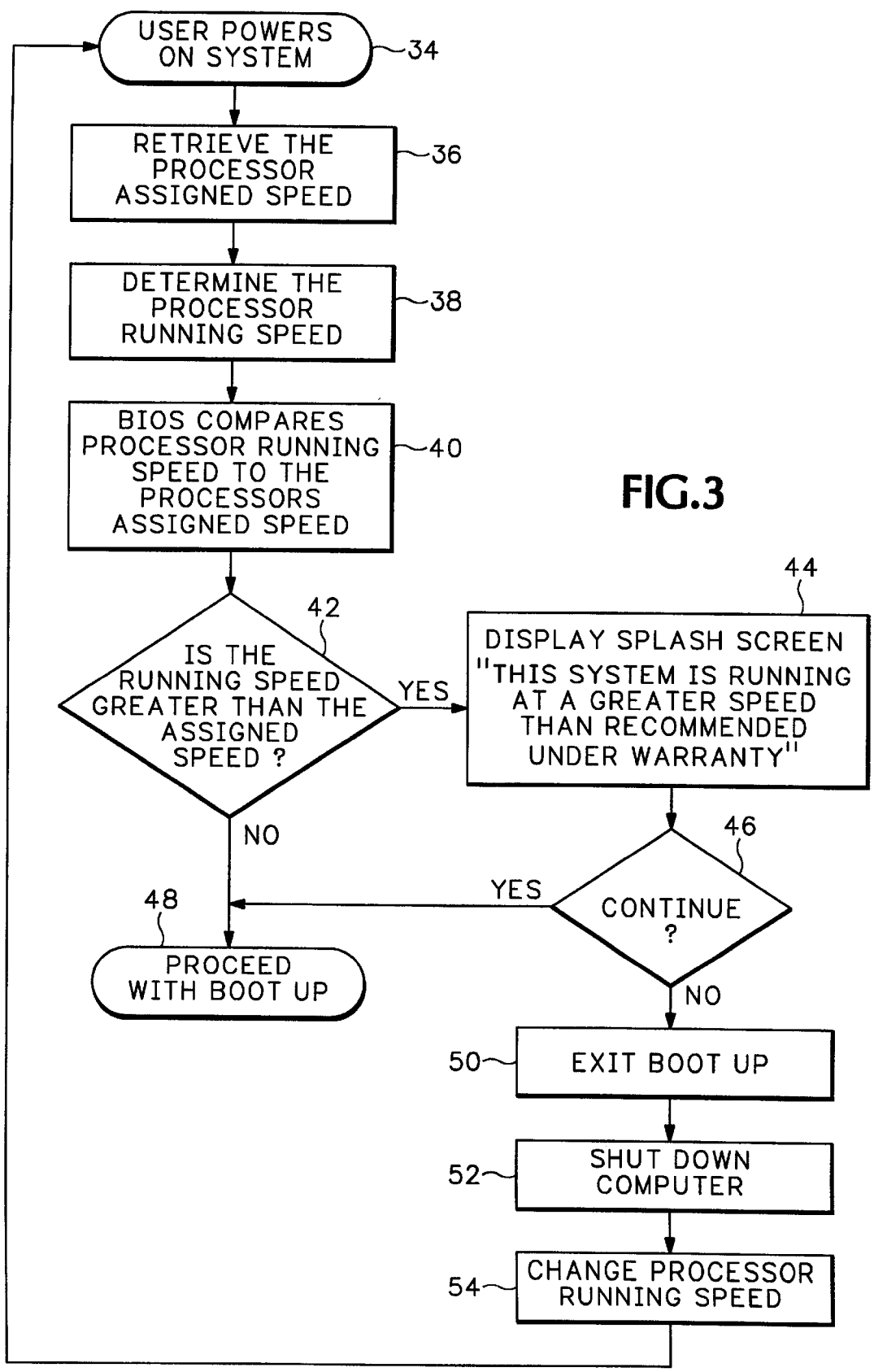
FIG. 3 is a flow chart of the CPU test of the present invention.

When executed by the system shown in FIG. 1, the coded test instructions result in the operations shown in FIG. 3. Referring to FIGS. 1 and 3, an end user (not shown) powers on the computer 16 at block 34. In a PC, this is accomplished by pressing an on/off switch 17 typically located at the front of computer 16. Immediately after power is applied, the computer 16 proceeds to boot itself up, that is, to start itself by loading the operating system and other basic software. At block 36, the test retrieves the assigned or rated speed 29 by reading it from a register 24 in CPU 22.

The manufacturer generally determines the assigned speed of the CPU 22 based on many different factors. Some of these factors relate to the design of the CPU itself, which dictates the internal timing requirements that limit the maximum speed the CPU can handle. Other factors relate to the process technology used, circuit size, die size, and process quality.

Due to the extreme precision required to make semiconductor devices, there are always manufacturing process variations that result in some failed devices and some devices that run faster than others even though they were produced with the same process and even with the same wafer. For these reasons, the devices must be individually tested throughout the manufacturing process to ensure that they perform all their necessary functions. The first tests are conducted on the chip while it is still in wafer and/or die form. These first tests generally confirm basic functionality because some chips never work at all due to manufacturing or material defects.

Final testing is done on packaged devices to determine both proper function and also assigned speed 29. Because of the same variations that render some devices unusable, some are capable of passing the battery of tests at higher speeds than others. Similar CPUs like Intel® Corporation's Pentium®133 MHz and Pentium®150 MHz, are typically manufactured on the same lines from the same wafers. The CPUs that pass final test at higher speeds are given the higher rating by storing the higher assigned speed 29 in register 24. Some devices cannot pass the tests without failing or possibly exceeding allowable heat generation limits, so they are rated lower by storing a lower assigned speed 29 in register 24. In some cases, dedicated manufacturing lines are created to produce parts of specific speeds, but occasionally devices are assigned a different—usually lower—speed than they have tested at to meet market demand.

Referring again to FIG. 3, after retrieving the CPU's assigned speed 29 by reading it out from register 24, the test of the present invention determines the actual running speed 31 of the CPU 22 at block 38. The running speed 31 is generally programmable into the BIOS 28 by a reseller or end user. An example of how to set the running speed 31 is as follows.

First, the end user enters the maintenance mode of computer 16. On many PCs this is accomplished by adding a hardware jumper (not shown) to a motherboard (not shown) housing the CPU 22 in the computer 16. Those skilled in the art will appreciate that several different means exist to place the computer 16 in a mode in which the end user or reseller can set or program the actual running speed of the CPU 22. Examples of these include hardware —e.g., using jumpers— and software/firmware program means.

Once in maintenance mode, the end user can program or set the desired actual running speed 31 independent of the CPU 22 assigned speed 29. The actual running speed 31 together with any other settings are saved in the BIOS 28. Those of skill in the art will appreciate that setting or programming a running speed 31 higher than the assigned speed 29 is not a guarantee that the computer 16 will actually function at the higher running speed 31. The end user takes the computer 16 out of maintenance by turning off the computer 16 and removing the previously added jumper (not shown). When power is reapplied, the computer 16 will run at the running speed 31 saved in BIOS 28.

At block 40, the test compares the assigned speed 29 to the running speed 31. If the running speed 31 is less than or equal to the assigned speed 29, the CPU 22 is not overclocked (block 42) and the computer 16 continues with its normal boot up (block 48). If the CPU 22 is not overclocked, the test operates invisible to the end user. That is, the end user does not know that the test was performed as part of the boot up process.

If, on the other hand, the running speed 31 is greater than the assigned speed 29 (block 42), the CPU 22 is overclocked and the test displays a caution message or splash screen 14 on the monitor 12 (block 44 on FIG. 3 and FIG. 1). The caution message 14 can, for example, read "This system is running at a greater speed than recommended under warranty." At block 46, the test queries the end user whether it wants to continue the boot up process in spite of having an overclocked CPU 22. If so, then the computer 16 continues to boot up at block 48.

Conversely, if the end user does not want to continue, the test exits the normal boot up process (block 50) and instructs the end user to power down the computer 16 (block 52).

Thereafter, the test instructs the end user to change the running speed 31 (block 54) of the CPU 22 as described above. After the end user adjusts the running speed 31, the test loops back to block 34 where the user powers on the computer 16 and the test ensures that the CPU 22 is not being overclocked, Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A method for determining when a central processing unit (CPU) in a computer system is being overclocked, comprising:

retrieving a processor assigned speed from an internal register in the CPU;

determining a processor running speed;

comparing the processor running speed to the processor assigned speed; and displaying a caution message on a computer monitor responsive to the comparison;

wherein the retrieving, measuring, comparing, and displaying are executed in a software routine internal to the CPU.

2. The method of claim 1 wherein displaying a caution message occurs only when the running speed is greater than the assigned speed.

3. The method of claim 1 including requesting user input after displaying the caution screen.

4. The method of claim 3 including changing the processor running speed responsive to the user input.

5. The method of claim 1 wherein the routine is part of a basic input/output system.

6. The method of claim 1 wherein the routine is CPU microcode.

7. A computer comprising a processor, a monitor, and storage medium internal to the processor, said storage medium having stored thereon instructions, that, when executed, result in:

retrieving a processor assigned speed from an internal register in the processor;

retrieving a processor running speed;

determining if the processor is being overclocked by comparing the running speed to the assigned speed; and displaying a caution message on the monitor responsive to the comparison.

8. The computer of claim 7 including requesting user input after displaying the caution screen.

9. The computer of claim 8 including changing the processor running speed responsive to the user input.

10. The computer of claim 8 wherein the retrieving, measuring, determining, and displaying are part of a basic input/output system.

11. The computer of claim 8 wherein the storage medium is internal to the processor and wherein the retrieving, measuring, determining, and displaying are part of microcode in the processor.

12. A computing system, comprising:

processing means having an assigned speed stored in an internal register and operable at a running speed;

first program code means internal to the processor for comparing the assigned speed to the running speed; and second program code means internal to the processing means for initiating a display of a caution message when the running speed is greater than the assigned speed and for requesting user input after displaying the caution message.

13. The computing system of claim 12 wherein the caution screen is not displayed when the running speed is less than or equal to the assigned speed.

14. The computing system of claim 12 wherein the first and second program code means is resident in basic input/output system.

15. The computing system of claim 14 wherein the processing means includes an internal register for storing the assigned speed.

16. The computing system of claim 14 wherein the running speed is stored in the basic input/output system.

17. The computing system of claim 12 wherein the first and second program code means are microcode resident in the central processing unit.

18. The computing system of claim 12 wherein the second program code means changes the running speed responsive to the user's input.

* * * * *